Patented Dec. 16, 1930

1,785,134

UNITED STATES PATENT OFFICE

HOWARD S. McQUAID, OF EAST CHICAGO, INDIANA, ASSIGNOR TO THE GRASSELLI CHEMICAL COMPANY, OF CLEVELAND, OHIO, A CORPORATION OF DELAWARE

SOLDERING

No Drawing. Application filed December 26, 1929. Serial No. 416,751.

The action of soldering fluxes seems to depend upon two main factors: dissolution of the oxide films on the metals to be united and reduction of the surface tension of the molten solder by which it becomes capable of spreading over the surface of the metal pieces. Zinc chloride has been used since time immemorial as a general soldering flux, and while it allows satisfactory uniting of metals by soldering, it is corrosive. Rosin or colophony and its alcoholic solutions have also fair fluxing properties; they are reasonably non-corrosive and have, particularly for this reason, though their efficiency is below that of zinc chloride, found quite extensive applications. Numerous other substances have been suggested as soft soldering fluxes, either alone or in conjunction with zinc chloride and rosin, but the above two remain practically undisputed masters of their respective fields.

The purpose of the present invention is to provide for a soldering flux which in efficiency, at least on tinplate, ranks with zinc chloride.

Another purpose of my invention is to provide for a soldering flux which besides its high efficiency is practically non-corrosive.

I have found that certain organic amines, such as hydroxy-alkyl-amines have in a very marked degree the properties required of an efficient, non-corrosive flux, and my invention comprises a soldering process in which the action of the solder is promoted by a hydroxy-alkyl-amine.

The hydroxy-alkyl-amines useful in my invention are those in which the amine and hydroxy groups are attached to different carbon atoms. They can be of primary, secondary or tertiary nature, that is to say, the amine nitrogen may carry more than one hydrocarbon radicles, which may be alike or different from each other. Fluxes useful in my invention may also contain one or more hydroxy and/or amine groups in the molecule. Up to a few years ago hydroxy-alkyl-amines were laboratory products, though some of them are found in various living organisms. Recent developments in organic, aliphatic chemistry have made a series of these compounds commercially available, and they have since found various important technical applications. I refer to the ethanolamines. Ethanolamines are derivatives of the aliphatic hydrocarbon ethane, in which one carbon atom carries a hydroxy group and the other one an amine group. The simplest ethanolamine is mono-ethanolamine of the formula:

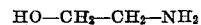

Di-ethanolamine has the formula:

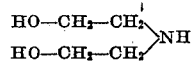

Tri-ethanolamine has the formula:

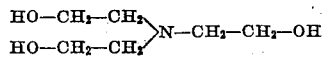

Each of these individual ethanolamines has been found by me to be an efficient flux in soft soldering of tin plate. It is, however, unnecessary to use the pure individual substances. A mixture containing all three ethanolamines in various proportions is obtained during the manufacture of these products and is commercially available. Such a mixture was likewise found to be an efficient flux and is particularly adapted for technical use.

Propanolamine and butanolamines are compounds of the same class and are applicable in the performance of my invention.

The hydoxyl-alkyl-amines in which the hydroxy and amine groups are attached to different carbon atoms are usually water soluble and salt forming, strong bases, some of them such as the ethanol, propanol, butanol, etc., amines are liquid at ordinary temperatures.

The application of my novel fluxing substances in the soldering of metal does not require any substantial modifications from the standard and usual operations. When used alone, that is to say without addition of another of the commonly used fluxes, they allow the solder to wet and spread evenly over the metal pieces to be united and do not interfere with the bond between metal and solder. They do not produce any corrosion at the bond, leaving at the worst a slight blackish residue which is easily removed if desired.

In hand soldering I may for instance use a 10% aqueous solution of technical ethanol-amine and this is applied with a brush, as is common practice, to the cleaned metal surfaces, the solder then being applied with a soldering copper.

Fluxing solutions of my invention are well suited to mechanical soldering, especially the soldering of tin plate containers, commonly called tin cans, where a supply of the fluxing solution is kept on hand and distributed mechanically over the pieces to be united. In general my fluxes are applicable wherever rosin fluxes can be used.

My novel hydroxy-alkyl-amine fluxes are particularly efficient on soft soldering of tin plate where they give a bond at least equal to that obtained with a zinc chloride flux. On brass, copper, etc., I have found that they are less desirable though they also produce there the spreading of the molten solder and a fair contact between solder and metal, which assists in the bonding of the metal pieces.

Due to their high solubility in water and alcohols I can use my fluxes straight or in the form of such solutions, and the fluxes can be diluted to suit any particular working conditions, it being well known in this art how to modify fluxes to make them act in the most favorable manner on a given job.

I am unable to explain the reasons why these particular amine bodies have such a remarkable property. I tested numerous other organic amines containing no hydroxy group, amongst which I might mention aniline, ethylamine, butylamine, metanitraniline and others, and I found that none of them have any outstanding or even noticeable fluxing properties. I also tested some aromatic hydroxy amines, such para-aminophenol, and found that they are likewise of no interest as a soldering flux.

It is my suggestion that the fluxing properties of the hydroxy-alkyl-amines in which the hydroxy and amine groups are attached to different carbon atoms is due to the peculiar combination of the strong basicity of the amine group with the typical hydroxy group reactions.

I claim:

1. In a process of uniting metals by means of a solder the step of applying a soldering flux comprising a hydroxy-alkyl-amine in which the hydroxy and amine groups are attached to different carbon atoms.

2. In a process of uniting metals by means of a solder the step of applying a soldering flux comprising an ethanol-amine.

3. In a process of soft soldering tin plate the step of applying a soldering flux comprising an ethanol-amine.

4. In a process of soft soldering tin plate the step of applying a soldering flux comprising a mixture of ethanol-amines.

5. A soldering flux comprising a hydroxy-alkyl-amine in which the hydroxy and amine groups are attached to different carbon atoms.

6. A soldering flux comprising an ethanol-amine.

In testimony whereof, I affix my signature.

HOWARD S. McQUAID.